United States Patent
Lietar et al.

[11] 4,081,210
[45] Mar. 28, 1978

[54] COMPOSITE FOUR-ELEMENT LENS SYSTEM, PARTICULARLY FOR USE WITH LASER BEAMS

[75] Inventors: Christian Lietar; Jean-Pierre Blanc, both of Morges, Switzerland

[73] Assignee: Robert Bosch GmbH, Stuttgart, Germany

[21] Appl. No.: 659,730

[22] Filed: Feb. 20, 1976

[30] Foreign Application Priority Data

Feb. 27, 1975 Germany .............................. 2508491

[51] Int. Cl.² .............................................. G02B 9/34
[52] U.S. Cl. .................................................... 350/223
[58] Field of Search ........................................ 351/223

[56] References Cited

U.S. PATENT DOCUMENTS

| 2,310,502 | 2/1943 | Warmisham | 350/223 |
| 3,454,327 | 7/1969 | Turula et al. | 350/223 |

FOREIGN PATENT DOCUMENTS

| 245,820 | 3/1966 | Austria | 350/223 |
| 696,167 | 8/1953 | United Kingdom | 350/223 |

*Primary Examiner*—Paul A. Sacher
*Attorney, Agent, or Firm*—Flynn & Frishauf

[57] ABSTRACT

To reduce the size of the beam spot of a laser beam, a four-element lens having the characteristics set forth in the table forming part of the specification, is used, thereby providing a large-aperture objective with a field being about 2°, coma corrected and with low image field convexity.

1 Claim, 1 Drawing Figure

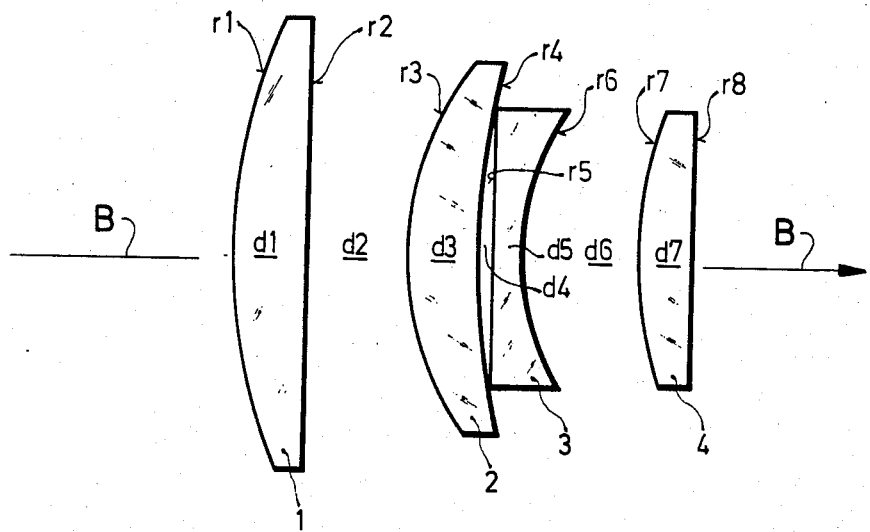

COMPOSITE FOUR-ELEMENT LENS SYSTEM, PARTICULARLY FOR USE WITH LASER BEAMS

The present invention relates to a multi-element objective, and more particularly to a four-element objective for use with laser beams.

To provide for a beam spot of minimum size, microscope objectives with high numerical aperture values have been used. The size and weight of such objectives is, however, comparatively great. In various applications it is disadvantageous to use lens systems of such high weight and large size.

It is an object of the present invention to provide a multi-element objective which has a high aperture ratio and which generates an image spot from a beam impinging on the lens element parallel to its axis, which image spot is limited only by the diffraction.

SUBJECT MATTER OF THE PRESENT INVENTION

Briefly, a four-element lens is provided of characteristics set forth in the table in the specification; the radii of curvature of the lenses, the refractive indices, and the dimensions (thickness of the lenses and their spacing) bear a definite relation, in the example selected relating to a focal length of 100 mm. The focal length and the distances of the refractive planes vary by no more than 10% from the values given in the table; the refractive power $1/f$ of the objective differs in the ratio $(n\alpha - 1)/r$ of the respective refractive surfaces not more than by 10%; the refractive indices given are for the spectral line $d$.

DRAWING

The single FIGURE illustrates, in a highly schematic example, a longitudinal section through the objective, in accordance with the present invention.

The objective has lens elements 1, 2, 3, 4 of thicknesses $d_1, d_3, d_5, d_7$; the elements are spaced by the distances $d_2, d_4, d_6$. Thus, the lens elements have been given odd subscripts, the distance spacings even subscripts. The refractive surfaces of the lenses have radii of curvature $r$, with respective odd and even sequential subscripts. The refractive index $n_d$, in the following table, has been given the same subscript as the respective distance subscript.

The objective is matched to a wave length $\lambda = 0.488$ $\mu$m of a laser beam B.

The numerical aperture of the objective is 0.41. The quality of a field of 2° can be characterized as good, since coma is corrected and the convexity of the image field is low. The field of 2° permits some leeway regarding the alignment of the optics with respect to the laser beam. Thus, the objective need not be aligned with the laser beam with extreme accuracy.

The subsequent table is directed to a focal length of $f = 100$ linear units; the refractive indices are for the spectral line $d$.

An objective constructed in accordance with the data of the table permits information recording by means of a laser beam under optimum conditions. In particular, it permits, when using a laser beam, reading or sensing of extremely small transparent regions or apertures in a disk. Such apertures may, for example, be found in records of television images, for example videodisks. The apparatus of the present invention is also particularly useful in manufacture of microelectronic circuits and data recording and retrieval systems.

The objective described in the example is matched to the wavelength of a particular laser; it can readily be designed to be matched to wave lengths within the visible spectrum, and with good optical quality.

The use of the objective is not limited to light within the visible spectrum; it can include light waves of different ranges if glass of approximately similar refractive index, but with a lower Abbe number is selected for the dispersion lens 3. A suitable selection of such glass will be obvious.

Table

| Lens No. | Radius of Curvature (linear units) r | Dimensions (in linear units): odd numbers: lens thickness; even numbers: lens distances d | Refractive Index $n_d$ | Abbe No. |
|---|---|---|---|---|
| 1 | $r_1 = 113.5$ | | | |
| | | $d_1 = 16.25$ | $n_1 = 1.69100$ | $\nu_1 = 54.7$ |
| | $r_2 = 1004$ | | | |
| | | $d_2 = 21.25$ | $n_2 = 1.00000$ | |
| 2 | $r_3 = 60.87$ | | | |
| | | $d_3 = 16.25$ | $n_3 = 1.69100$ | $\nu_2 = 54.7$ |
| | $r_4 = 202.5$ | | | |
| | | $d_4 = 2.35$ | $n_4 = 1.00000$ | |
| 3 | $r_5 = 4637$ | | | |
| | | $d_5 = 7.5$ | $n_5 = 1.69100$ | $\nu_3 = 54.7$ |
| | $r_6 = 61.75$ | | | |
| | | $d_6 = 23.75$ | $n_6 = 1.00000$ | |
| 4 | $r_7 = 77.37$ | | | |
| | | $d_7 = 12.5$ | $n_7 = 1.69100$ | $\nu_4 = 54.7$ |
| | $r_8 = 3584.$ | | | |

We claim:

1. Composite four-element objective lens having four lens elements (1, 2, 3, 4), each having a forward and backward radius of curvature ($r$), said lens elements being spaced from each other by predetermined distances ($d_{even}$), have predetermined thickness ($d_{odd}$) and are made of materials of predetermined refractive indices ($n_d$), with material of refractive index 1.000 between said elements;

wherein the relationships of the radii, dimensions, and refractive indices, for a spectral line $d$ are set forth in the claim table forming part of this claim, with reference to a focal length of 100 linear units; and wherein $r$ is the radius of curvature and $n_d$ the refractive index for the spectral line $d$, of the respective lens element;

Claim Table

| Lens No. | Radius of Curvature (linear units) r | Dimensions (in linear units): odd numbers: lens thickness; even numbers: lens distances d | Refractive Index $n_d$ |
|---|---|---|---|
| 1 | $r_1 =$ 113.5 | | |
|   |                | $d_1 =$ 16.25 | $n_1 =$ 1.69100 |
|   | $r_2 =$ 1004 | | |
|   |                | $d_2 =$ 21.25 | $n_2 =$ 1.00000 |
| 2 | $r_3 =$ 60.87 | | |
|   |                | $d_3 =$ 16.25 | $n_3 =$ 1.69100 |
|   | $r_4 =$ 202.5 | | |
|   |                | $d_4 =$ 2.35 | $n_4 =$ 1.00000 |
| 3 | $r_5 =$ −4637 | | |
|   |                | $d_5 =$ 7.5 | $n_5 =$ 1.69100 |
|   | $r_6 =$ 61.75 | | |
|   |                | $d_6 =$ 23.75 | $n_6 =$ 1.00000 |
| 4 | $r_7 =$ 77.37 | | |
|   |                | $d_7 =$ 12.5 | $n_7 =$ 1.69100 |
|   | $r_8 =$ −3584. | | |

* * * * *